March 4, 1958     P. L. HICKS     2,825,134
DEVICE FOR USE IN MAKING IMPRESSIONS FROM
DENTAL IMPRESSION MATERIAL
Filed Jan. 9, 1956
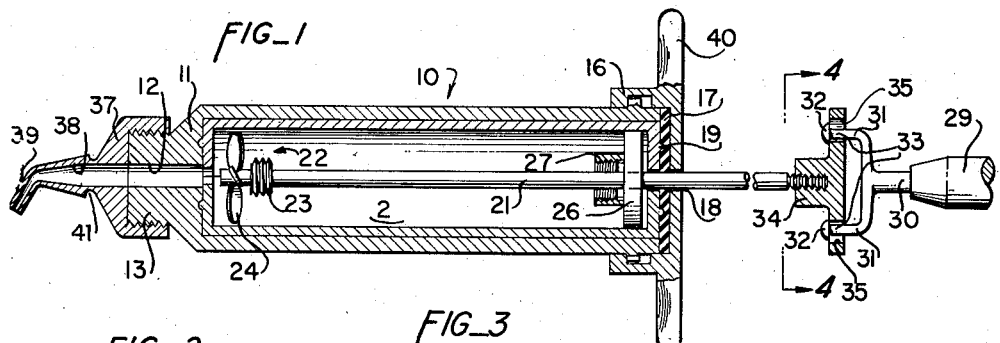
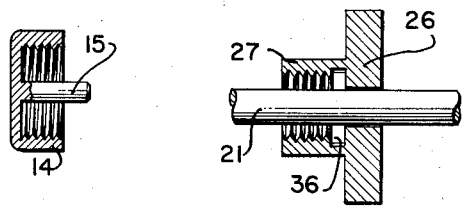
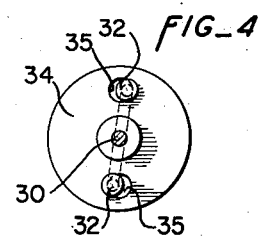
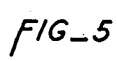
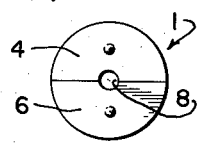
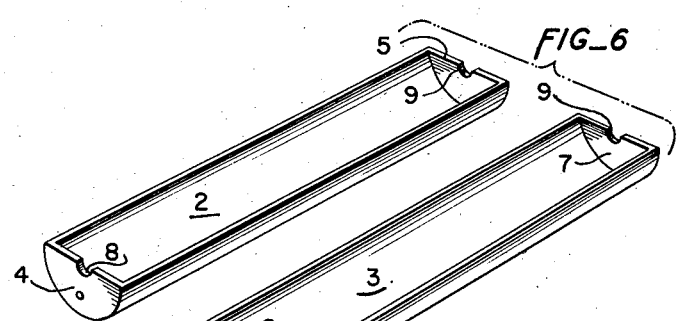
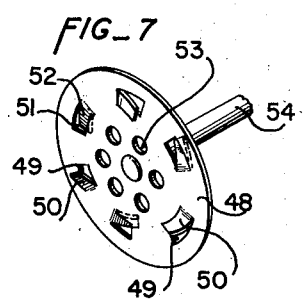
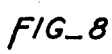
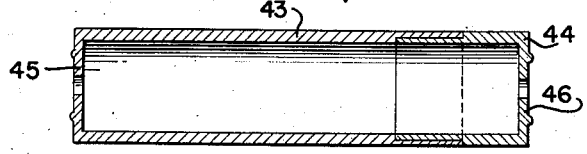
INVENTOR.
PAUL L. HICKS
BY
ATTORNEYS

United States Patent Office

2,825,134
Patented Mar. 4, 1958

2,825,134

DEVICE FOR USE IN MAKING IMPRESSIONS FROM DENTAL IMPRESSION MATERIAL

Paul L. Hicks, Pacific Grove, Calif.

Application January 9, 1956, Serial No. 558,021

4 Claims. (Cl. 32—17)

This invention relates to a device for use in making impressions from quick setting plastic dental impression material.

There are a number of dental impression materials that are in use. One of these is generally known as a rubber base material known under the trade name of "neoprene" and an accelerator therefor. The plastic portion (as distinguished from the accelerator) is a viscous plastic and is kept separate from the accelerator until ready for use, since the mixture will set up in several minutes from the time the accelerator is mixed with the plastic.

Heretofore it has been customary to mix the plastic and the accelerator on a slab and to then apply the resultant mix to the tooth cavity or other place in the mouth of the patient where an impression is wanted. This mix does not require heating to enable it to form a good impression, and it is stable when it sets. However, its excessive stickiness together with is rapid setting time has prevented its satisfactory transfer to a syringe to be properly injected into a cavity or crown preparation or around the necks of the teeth to be included in the impression.

Another impression material known under the trade name of "Alginate" is a powder that requires mixing with water, and when so mixed it forms a gelatinous mass that has a critical setting time that is similar to that of the rubber base impression material above described. The present invention enables this material to be satisfactorily mixed and applied in generally the same manner as the plastic rubber base material.

One of the objects of the present invention is the provision of a means and method for quickly and efficiently making an accurate dental impression from the above mentioned impression materials and for accomplishing desired and improved results that are impossible of accomplishment by heretofore used methods and devices.

Another object of the invention is the provision of a device adapted to be used for making dental impressions from the materials above mentioned and from similarly acting materials, and the use of which device facilitates the making of the desired impressions over methods and means heretofore adopted.

A still further object of the invention is the provision of an improved method of making dental impression in which the materials for making said impression is mixed within an enclosed space and is then directly ejected, under pressure, from said space and to the desired site in the mouth of the patient.

Other objects and advantages will appear in the description and in the drawings.

In the drawings, Fig. 1 is a vertical sectional view through the device with a portion of the driving means being shown in elevation.

Fig. 2 is a part sectional and part elevational view of the cap that is used during an actual mixing operation.

Fig. 3 is an enlarged part sectional and part elevational view of the piston that is shown in Fig. 1.

Fig. 4 is a view as seen from line 4—4 of Fig. 1.

Fig. 5 is an end view of the inner side or inner casing of Fig. 6 in assembled relation.

Fig. 6 is a perspective view of the parts of the casing of Fig. 5 when separated.

Fig. 6a is an enlarged fragmentary plan view of one of the members shown in Fig. 6.

Fig. 7 is a modified view of a mixing element for use in manually mixing the impression material adapted to be placed in the casing of Figs. 1, 6, 8.

Fig. 8 is a view of an inner casing adapted to be used in certain instances instead of the casing of Fig. 6.

It should be noted that in an actual mixing operation the cap of Fig. 2 is substituted for the nozzle shown in Fig. 1, and except for this Fig. 1 shows the device ready for a mixing operation.

In detail, the form of the invention illustrated in Fig. 1 comprises an inner casing or container in the form of a pair of corresponding semicylindrical members 2, 3 that are adapted to be placed together to form a cylindrical inner casing that is generally designated 1. These members have corresponding end walls 4, 5 (on member 2) and 6, 7 (on member 3) and when the members are placed together as above explained, the walls 4, 6 will form one end of the cylindrical inner casing, and walls 5, 7 will form the other end. Semicircular recesses 8 respectively formed centrally along the free edges of the walls 4, 6, will provide a central aperture in one end of the cylindrical inner casing, and similar recesses 9 respectively formed along the free edges of walls 5, 7 will form a central aperture at the other end of the inner casing.

A cylindrical outer casing generally designated 10 is open at one end for receiving the inner casing 1, and the opposite end of the casing 10 is provided with a head 11 against which the end walls 4, 6 of the inner casing are adapted to abut.

The head 11 is formed with a central discharge passageway 12 that is coaxial with the aperture formed by recesses 8 and which passageway extends through an externally threaded boss 13.

A closure cap 14 (Fig. 2) is adapted to be threadedly secured on boss 13 and this cap preferably carries a plug 15 that is adapted to fill the passageway 12 all the way to the end that is next to and substantially adjoins the recesses 8.

A closure 16 (Fig. 1) is removably secured to the end of the outer casing 10 at the end of the latter that is opposite to the head, and this closure is secured to the casing 10 in any suitable manner, such as by projections on the end of the casing engaging in ordinary bayonet slots. A rubber or resilient washer 17 is positioned between the closure 16 and the adjacent end of the casing 10 and the end of the inner casing 1 and said closure. Both the closure 16 and the washer are centrally apertured coaxial with the aperture formed by recesses 9, the central aperture in closure 16 being indicated at 18.

The end walls 5, 7 may be respectively formed with slight projections 19 that are adapted to engage the washer 17 for holding the members 2, 3 against movement within the outer casing, and if desired the other end walls 4, 6 may be formed with similar protuberances adapted to enter complementarily formed recesses in the inner side of the head 11.

A shaft or rod 21 reciprocably extends through the central opening in the washer or gasket 17 and the central aperture 18 in the closure 16. The washer may form a seal with the rod to prevent any likelihood of leakage therepast.

The inner end of the rod 21 that is within the inner casing 1 has a mixing element 22 secured thereto. This element may have an externally threaded hub 23 rigidly or releasably secured to the rod 21. The element 22 may consist of mixing blades 24 that function to quickly mix the contents of the inner casing upon rotation of said element and reciprocation thereof within the inner casing by rotation of shaft 21 and the reciprocation of the latter.

Rod 21 also slidably passes through a piston 26 that is fitted within the inner casing 1 for movement from end to end of the latter. This piston carries an internally threaded hollow boss 27 that is adapted to be engaged by the threads on hub 23 where the latter is moved into the hub and is rotated in a direction opposite to the normal direction of rotation of the rod 21.

The method of making a dental impression is to first load each of the members 2, 3 with the material to be mixed. For example, the "neoprene" or plastic may be placed in the member 2 and the accelerator may be placed in the member 3; as long as these two ingredients are kept separate there is no danger of their setting.

The rod 21 may then be laid in recess 9 with the mixing element 22 separate from the piston 26, and with the piston and said element disposed in one of the two members 2, 3. The closure 16 is slipped over the outer end of the rod 2 and then the elements 2, 3 are placed together to form a cylindrical casing, and this casing is then slipped into the open end of outer casing 10 and the closure 16 is secured over the end of said casing 10.

The power driven chuck 29 of the dental engine has a shank 30 secured therein and this shank carries a pair of prongs 31 equally spaced from the axis of the shank 30, each prong having an enlarged head 32 on its outer end, leaving a restricted neck 33 adjoining each head.

As soon as the inner and outer casings 1, 10 are together as above described, and immediately after the closure 16 is secured on the end of outer casing 10, a disc 34 is threadedly or otherwise suitably secured to the outer end of rod 21, which disc has a pair of openings 35 formed therein (Fig. 4). These openings are preferably large enough to permit the head 32 to pass therethrough.

Upon starting the dental engine the mixing element 24 will be rotated and the said element can be drawn back and forth through the inner casing from end to end thereof thus thoroughly and very rapidly mixing the contents of the inner casing. Heads 32 on prongs 31 will extend partially over the side of disc 34 during rotation of the disc, so that the prongs will retain their connection with the disc as the mixing element 24 is drawn toward the piston, the latter being positioned against the ends 5, 7 of the members 2, 3.

Only a few seconds are required to complete the mixing operation, after which the prongs 31 are disconnected from the disc 34, and the threaded boss 27 is placed in threaded engagement with the hub 23. This boss may be formed with openings 36 (Fig. 3) adjacent to the piston so that material within the boss will move out of said openings as the hub enters the boss.

The closure cap 14 is then replaced by the special discharge nozzle 37 shown in Fig. 1.

This nozzle 37 has a threaded base that engages the threaded boss on the head 11, and said nozzle is formed with a passageway 38 that may be substantially as large in diameter as the passageway 12 in boss 13. However, the outer end 39 of the nozzle extends at an angle to the passageway 38 and is needle-like in size having a small passageway communicating with the larger passageway 38.

Closure 16 has a pair of radially oppositely outwardly extending lugs 40 rigid therewith for engagement by the middle and forefinger of a hand when the thumb is on disc 34, thus enabling the operator to use the device in the manner of a syringe or hypodermic needle. The impression material will be discharged through the needle-like end 39 of the nozzle 37 for depositing the impression material accurately and solidly in a cavity or around the necks of the teeth so as to insure a flawless impression being made.

The nozzle 37 may be formed of plastic or any suitable material and is preferably formed with a line of weakness (such as a groove or notch 41) that will enable the needle-like end 39 to be broken off so that a greater volume and mass of the impression material may be discharged from passageway 38.

As soon as the desired cavity or recesses are filled with the impression material, and the discharge of a larger volume is desired, the end 39 is quickly broken off and immediately the larger volume will be discharged.

The device may be made sufficiently cheaply to be expendable, or if desired, any or all parts may be permanent or replaceable.

As already pointed out, the members 2, 3 are identical, and to prevent leakage along the line of division between them, one of the longitudinal edges of each member is formed with a ridge 56 connecting at their ends with ridges 57 that extend along the end walls 4, 5 to the openings 8, 9 while a groove 58, complementary to ridge 56 is formed along the edge of the other side of each member. Grooves 59 connecting with the ends of grooves 58 extend to the central openings 8, 9. Thus while each member is identical in structure, a tongue and groove joint is provided when they are together which not only prevents leakage but also holds the members against shifting relative to each other.

In certain impression material of the kind that is provided in powder form for mixing with water (as in example) the inner casing may be divided transversely into two parts 43, 44 (Fig. 8) with a telescopic substantially leak proof joint. Centrally apertured heads 45, 46 are provided for the ejection of the material from one end of the casing and for passage of the rod 21 through the other end.

The manner of operation is much the same as in the form already described, the disc 34 being removed for passage of the cap end of the inner casing over the rod, after which the disc is replaced.

In Fig. 7 a slightly modified form of mixing element in the form of a disc 48 is indicated, which element may manually be moved back and forth through the inner casing. Apertures 49 may be formed in said element 48 with vanes 50 slantingly extending in one direction at one side of said element and spaced over said apertures, while similar apertures 51 have similar vanes 52 associated therewith at the opposite side of the element and slantingly extending in a direction oppositely to the vanes 50. Other ordinary circular openings 53 may be formed in the element 48 to facilitate reciprocation of the element by manually moving rod 54 (that corresponds to rod 21) back and forth.

I claim:

1. A device for use in making a dental impression comprising: an elongated cylindrical holder for holding a supply of dental impression material, said holder including an ejection nozzle at one end thereof for discharge of said material from said holder and a piston within the opposite end movable against said material and toward said nozzle for effecting said discharge of said material, a mixing element within said holder between said nozzle and said piston actuatable for movement through said material to mix the latter and means connected with said piston and reciprocably extending outwardly from said holder through the end of said holder opposite to said nozzle for manually so moving said piston toward said nozzle to effect said discharge of said material, said holder including an outer and an inner casing, in coaxial relation, said outer casing being a unitary cylinder and said inner casing being longitudinally divided into halves, a cap removably secured on the end of said outer casing at the end of the latter opposite to said nozzle for holding said inner casing within said outer casing and formed with a central opening for the means connected with said piston, said nozzle being carried by said outer casing, said mixing element and said piston being within said inner casing and said inner casing having ported end walls for passage of said impression material to said nozzle and for passage of the piston actuating means to the opening in said cap, respectively.

2. A device for use in making a dental impression comprising: an inner tubular shell and an outer tubular sheet fixed within said outer shell coaxial with the latter, said inner tubular shell having opposite centrally apertured end walls and being longitudinally divided to provide corresponding halves, a cap secured to one end of said outer shell for releasably holding said inner shell within said outer shell and an end wall at the opposite end of said outer shell having a central discharge opening coaxial with the central aperture in the end wall of the inner shell that is adjacent thereto, a discharge nozzle projecting from said end wall for material discharged through said central opening, a mixing element and a piston within said inner shell, said cap having a central opening, a rod reciprocable and rotatable through said opening in said cap and through the opening in the end wall of said inner shell that is nearest to said cap, means for connecting said rod with said element for rotating the latter and for moving said element longitudinally of said inner shell from one end thereof to the other, and means for detachably connecting said rod with said piston for moving said piston axially through said inner shell to effect discharge of said material through said nozzle.

3. A device for use in making a dental impression from relatively quick setting dental impression material comprising; a tubular holder for said material, a piston movable within said holder from one end thereof to the other end, a discharge nozzle on said other end, said nozzle having a relatively small needle-like outer end portion formed with a passageway for discharge of said material and a relatively large diameter inner end portion having a substantially larger passageway communicating between the passageway in said outer end portion and the inside of said holder, said nozzle being frangible at the juncture between said inner end portion and said outer end portion to enable said outer end portion to be quickly broken off, means within said holder movable from end to end thereof for mixing said material, and means extending through the end of said holder opposite to said nozzle and connected with said element for so moving said element.

4. A device for use in making a dental impression from relatively quick setting dental impression material comprising; a tubular holder for said material, a piston movable within said holder from one end thereof to the other end, a discharge nozzle on said other end, said nozzle having a relatively small needle-like outer end portion formed with a passageway for discharge of said material and a relatively large diameter inner end portion having a substantially larger passageway communicating between the passageway in said outer end portion and the inside of said holder, said nozzle being frangible at the juncture between said inner end portion and said outer end portion to enable said outer end portion to be quickly broken off, means within said holder movable from end to end thereof for mixing said material, and means extending through the end of said holder opposite to said nozzle and connected with said element for so moving said element, said last mentioned means being a rod, means extending through said piston and interengageable means in said rod and on said piston for connecting them when said element is nearest the end of said holder that is opposite to said nozzle.

References Cited in the file of this patent

UNITED STATES PATENTS

| | | |
|---|---|---|
| 2,155,334 | Sitkin et al. | Apr. 18, 1939 |
| 2,349,607 | Berger | May 23, 1944 |